United States Patent
Rhoads et al.

(10) Patent No.: US 6,768,809 B2
(45) Date of Patent: *Jul. 27, 2004

(54) DIGITAL WATERMARK SCREENING AND DETECTION STRATEGIES

(75) Inventors: Geoffrey B. Rhoads, West Linn, OR (US); Ravi K. Sharma, Hillsboro, OR (US)

(73) Assignee: Digimarc Corporation, Tualatin, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 10/359,015

(22) Filed: Feb. 4, 2003

(65) Prior Publication Data

US 2003/0174862 A1 Sep. 18, 2003

Related U.S. Application Data

(63) Continuation of application No. 09/526,982, filed on Mar. 15, 2000, now Pat. No. 6,516,079, which is a continuation-in-part of application No. 09/503,881, filed on Feb. 14, 2000, now Pat. No. 6,614,914.

(51) Int. Cl.$^7$ .............................................. G06M 9/00
(52) U.S. Cl. ....................................................... 382/100
(58) Field of Search .................................. 382/100, 190, 382/195, 206, 209, 219, 220, 221, 224, 229, 232, 233, 235, 276, 278, 280, 286, 287; 713/155, 160, 161, 162, 168, 176, 179, 180, 181, 187, 189; 380/200, 252, 253, 254, 277, 56; 348/465, 604

(56) References Cited

U.S. PATENT DOCUMENTS

| | | | |
|---|---|---|---|
| 2,630,525 A | 3/1953 | Tomberlin et al. | 455/70 |
| 3,493,674 A | 2/1970 | Houghton | 348/478 |
| 3,562,420 A | 2/1971 | Thompson | 348/607 |
| 3,569,619 A | 3/1971 | Simjian | 235/380 |
| 3,585,290 A | 6/1971 | Sanford | 348/478 |
| 3,665,162 A | 5/1972 | Yamamoto et al. | 249/219.2 |
| 3,703,628 A | 11/1972 | Philipson, Jr. | 235/432 |
| 3,805,238 A | 4/1974 | Rothfjell | 382/118 |

(List continued on next page.)

FOREIGN PATENT DOCUMENTS

| | | | |
|---|---|---|---|
| DE | 2943436 | 5/1971 | G06K/19/06 |
| DE | 3806411 | 9/1989 | H04B/1/66 |

(List continued on next page.)

OTHER PUBLICATIONS

"Access Control and COpyright Protection for Images, Conditional Access and Copyright Protection Based on the Use of Trusted Third Parties," 1995, 43 pages.

(List continued on next page.)

*Primary Examiner*—Andrew W. Johns
*Assistant Examiner*—Shervin Nakhjavan
(74) *Attorney, Agent, or Firm*—Digimarc Corporation

(57) ABSTRACT

To enhance decoding of signals suspected of containing an embedded auxiliary signal, a suspect signal is screened to compute detection values evincing presence and strength of the embedded signal. Screening strategies control detector actions, such as rejecting un-marked signals, improving synchronization of a reader used to extract hidden messages in suspect signals, determining authenticity of signals, and controlling use of the signals.

20 Claims, 3 Drawing Sheets

U.S. PATENT DOCUMENTS

| | | | |
|---|---|---|---|
| 3,809,806 A | 5/1974 | Walker et al. ............... 347/260 |
| 3,838,444 A | 9/1974 | Loughlin et al. ........... 348/486 |
| 3,845,391 A | 10/1974 | Crosby ......................... 455/39 |
| 3,914,877 A | 10/1975 | Hines ........................... 380/54 |
| 3,922,074 A | 11/1975 | Ikegami et al. ............... 380/54 |
| 3,971,917 A | 7/1976 | Maddox et al. ......... 235/462.39 |
| 3,982,064 A | 9/1976 | Barnaby ..................... 348/467 |
| 3,984,624 A | 10/1976 | Waggener ................... 348/473 |
| 3,998,160 A | 12/1976 | Pearce ........................ 101/488 |
| 4,025,851 A | 5/1977 | Haselwood et al. .......... 725/22 |
| 4,038,596 A | 7/1977 | Lee ............................. 324/210 |
| 4,225,967 A | 9/1980 | Miwa et al. ................... 455/68 |
| 4,230,990 A | 10/1980 | Lert, Jr. et al. ............... 725/22 |
| 4,231,113 A | 10/1980 | Blasbalg ....................... 380/34 |
| 4,237,484 A | 12/1980 | Brown .................. 375/240.12 |
| 4,238,849 A | 12/1980 | Gassmann .................. 370/204 |
| 4,252,995 A | 2/1981 | Schmidt et al. ............. 370/204 |
| 4,262,329 A | 4/1981 | Bright et al. ................ 713/164 |
| 4,313,197 A | 1/1982 | Maxemchuk ............... 370/210 |
| 4,367,488 A | 1/1983 | Leventer et al. ............ 348/467 |
| 4,379,947 A | 4/1983 | Warner ....................... 370/204 |
| 4,380,027 A | 4/1983 | Leventer et al. ............ 348/467 |
| 4,389,671 A | 6/1983 | Posner et al. ............... 380/235 |
| 4,395,600 A | 7/1983 | Lundy et al. .............. 381/73.1 |
| 4,423,415 A | 12/1983 | Goldman .................. 340/5.86 |
| 4,425,642 A | 1/1984 | Moses et al. ............... 370/477 |
| 4,425,661 A | 1/1984 | Moses et al. ............... 375/130 |
| 4,476,468 A | 10/1984 | Goldman .................. 340/5.86 |
| 4,495,620 A | 1/1985 | Steele et al. ................ 370/477 |
| 4,528,588 A | 7/1985 | Lofberg ....................... 340/5.1 |
| 4,532,508 A | 7/1985 | Ruell ......................... 340/5.83 |
| 4,547,804 A | 10/1985 | Greenberg ................. 348/460 |
| 4,553,261 A | 11/1985 | Froessl ...................... 382/306 |
| 4,590,366 A | 5/1986 | Rothfjell .................... 235/494 |
| 4,595,950 A | 6/1986 | Lofberg ...................... 380/202 |
| 4,637,051 A | 1/1987 | Clark ......................... 382/101 |
| 4,639,779 A | 1/1987 | Greenberg ................. 382/101 |
| 4,644,582 A | 2/1987 | Morishita et al. .......... 382/130 |
| 4,647,974 A | 3/1987 | Butler et al. ................. 725/36 |
| 4,654,867 A | 3/1987 | Labedz et al. .............. 455/438 |
| 4,660,221 A | 4/1987 | Dlugos ........................ 705/62 |
| 4,663,518 A | 5/1987 | Borror et al. ............... 235/487 |
| 4,665,431 A | 5/1987 | Cooper ...................... 348/480 |
| 4,672,605 A | 6/1987 | Hustig et al. ............... 370/201 |
| 4,675,746 A | 6/1987 | Tetrick et al. .............. 358/296 |
| 4,677,435 A | 6/1987 | Cause D'Aggraives et al. ......................... 340/5.67 |
| 4,677,466 A | 6/1987 | Lert, Jr. et al. ............... 725/22 |
| 4,682,794 A | 7/1987 | Margolin ..................... 725/19 |
| 4,697,209 A | 9/1987 | Kiewit et al. ............... 370/491 |
| 4,703,476 A | 10/1987 | Howard ...................... 370/491 |
| 4,712,103 A | 12/1987 | Gotanda .................... 340/5.53 |
| 4,718,106 A | 1/1988 | Weinblatt .................. 455/2.01 |
| 4,739,377 A | 4/1988 | Allen .......................... 355/133 |
| 4,750,173 A | 6/1988 | Bluthgen .................... 370/528 |
| 4,765,656 A | 8/1988 | Becker et al. ................. 283/70 |
| 4,775,901 A | 10/1988 | Nakano ........................ 360/60 |
| 4,776,013 A | 10/1988 | Kafri et al. ................. 348/460 |
| 4,805,020 A | 2/1989 | Greenberg ................. 348/460 |
| 4,807,031 A | 2/1989 | Broughton et al. ......... 348/460 |
| 4,811,357 A | 3/1989 | Betts et al. ................. 375/130 |
| 4,811,408 A | 3/1989 | Goldman ................... 382/115 |
| 4,820,912 A | 4/1989 | Samyn ....................... 235/449 |
| 4,835,517 A | 5/1989 | van der Gracht et al. ...................... 340/310.07 |
| 4,855,827 A | 8/1989 | Best ........................... 348/485 |
| 4,864,618 A | 9/1989 | Wright et al. ................ 380/51 |
| 4,866,771 A | 9/1989 | Bain ............................. 707/9 |
| 4,874,936 A | 10/1989 | Chandler et al. ........... 235/494 |
| 4,876,617 A | 10/1989 | Best et al. .................... 360/60 |
| 4,879,747 A | 11/1989 | Leighton et al. ............ 713/186 |
| 4,884,139 A | 11/1989 | Pommier |
| 4,885,632 A | 12/1989 | Mabey et al. ................. 725/20 |
| 4,903,301 A | 2/1990 | Kondo et al. ............... 704/501 |
| 4,908,836 A | 3/1990 | Rushforth et al. .......... 375/152 |
| 4,908,873 A | 3/1990 | Philibert et al. ............ 382/100 |
| 4,920,503 A | 4/1990 | Cook ......................... 348/552 |
| 4,921,278 A | 5/1990 | Shiang et al. ................. 283/87 |
| 4,939,515 A | 7/1990 | Adelson ....................... 341/51 |
| 4,941,150 A | 7/1990 | Iwasaki ...................... 375/145 |
| 4,943,973 A | 7/1990 | Werner ....................... 375/141 |
| 4,943,976 A | 7/1990 | Ishigaki ...................... 375/142 |
| 4,944,036 A | 7/1990 | Hyatt ........................... 364/43 |
| 4,963,998 A | 10/1990 | Maufe .......................... 360/60 |
| 4,965,827 A | 10/1990 | McDonald .................. 705/65 |
| 4,967,273 A | 10/1990 | Greenberg .................. 725/22 |
| 4,969,041 A | 11/1990 | O'Grady et al. ............ 348/473 |
| 4,972,471 A | 11/1990 | Gross et al. ................ 455/2.01 |
| 4,972,476 A | 11/1990 | Nathans ...................... 713/186 |
| 4,977,594 A | 12/1990 | Shear |
| 4,979,210 A | 12/1990 | Nagata et al. ................ 360/60 |
| 4,993,068 A | 2/1991 | Piosenka ..................... 713/186 |
| 4,996,530 A | 2/1991 | Hilton ........................ 341/120 |
| 5,010,405 A | 4/1991 | Schreiber et al. ......... 348/432.1 |
| 5,027,401 A | 6/1991 | Soltesz ........................ 380/54 |
| 5,036,513 A | 7/1991 | Greenblatt ................. 370/259 |
| 5,063,446 A | 11/1991 | Gibson ....................... 348/484 |
| 5,073,899 A | 12/1991 | Collier et al. ............... 375/135 |
| 5,075,773 A | 12/1991 | Pullen et al. .......... 375/240.01 |
| 5,077,608 A | 12/1991 | Dubner ...................... 348/583 |
| 5,077,795 A | 12/1991 | Rourke et al. ............... 380/55 |
| 5,079,648 A | 1/1992 | Maufe .......................... 360/31 |
| 5,083,224 A | 1/1992 | Hoogendoorn et al. ....... 360/60 |
| 5,086,469 A | 2/1992 | Gupta et al. ................ 713/160 |
| 5,091,966 A | 2/1992 | Bloomberg et al. ......... 382/203 |
| 5,095,196 A | 3/1992 | Miyata ....................... 235/382 |
| 5,103,459 A | 4/1992 | Gilhousen et al. .......... 370/206 |
| 5,113,437 A | 5/1992 | Best ........................... 380/253 |
| 5,128,525 A | 7/1992 | Stearns et al. .............. 235/454 |
| 5,134,496 A | 7/1992 | Schwab et al. ............... 386/94 |
| 5,144,660 A | 9/1992 | Rose .......................... 713/200 |
| 5,146,457 A | 9/1992 | Veldhuis et al. ............ 370/523 |
| 5,148,498 A | 9/1992 | Resnikoff et al. ........... 382/248 |
| 5,150,409 A | 9/1992 | Elsner ........................ 713/177 |
| 5,161,210 A | 11/1992 | Druyvesteyn et al. ...... 704/200 |
| 5,166,676 A | 11/1992 | Milheiser ................. 340/10.34 |
| 5,168,147 A | 12/1992 | Bloomberg ................. 235/456 |
| 5,181,786 A | 1/1993 | Hujink ......................... 400/61 |
| 5,185,736 A | 2/1993 | Tyrrell et al. ............... 370/358 |
| 5,199,081 A | 3/1993 | Saito et al. ................. 382/116 |
| 5,200,822 A | 4/1993 | Bronfin et al. ............... 725/22 |
| 5,212,551 A | 5/1993 | Conanan .................... 348/484 |
| 5,213,337 A | 5/1993 | Sherman ...................... 463/40 |
| 5,228,056 A | 7/1993 | Schilling .................... 375/144 |
| 5,243,423 A | 9/1993 | DeJean et al. .............. 348/473 |
| 5,245,165 A | 9/1993 | Zhang ........................ 235/454 |
| 5,245,329 A | 9/1993 | Gockebay .................. 340/5.33 |
| 5,247,364 A | 9/1993 | Banker et al. .............. 348/569 |
| 5,253,078 A | 10/1993 | Balkanski et al. .......... 382/250 |
| 5,257,119 A | 10/1993 | Funada et al. .............. 358/438 |
| 5,258,998 A | 11/1993 | Koide ......................... 375/220 |
| 5,259,025 A | 11/1993 | Monroe et al. ............... 705/75 |
| 5,267,334 A | 11/1993 | Normille et al. ............ 382/236 |
| 5,278,400 A | 1/1994 | Appel ........................ 358/3.28 |
| 5,280,537 A | 1/1994 | Sugiyama et al. .......... 370/527 |
| 5,293,399 A | 3/1994 | Hefti ........................ 340/10.34 |
| 5,295,203 A | 3/1994 | Krause et al. .............. 382/248 |
| 5,299,019 A | 3/1994 | Pack et al. .................. 382/236 |
| 5,305,400 A | 4/1994 | Butera ........................ 382/107 |
| 5,315,098 A | 5/1994 | Tow ............................ 23/494 |
| 5,315,448 A | 5/1994 | Ryan ............................ 360/60 |

| | | | | | |
|---|---|---|---|---|---|
| 5,319,453 A | 6/1994 | Copriviza ............... 346/6 | 5,582,103 A | 12/1996 | Tanaka et al. ............ 101/32 |
| 5,319,724 A | 6/1994 | Blonstein et al. ......... 382/248 | 5,587,743 A | 12/1996 | Montgomery ............ 348/473 |
| 5,319,735 A | 6/1994 | Preuss et al. ............. 204/205 | 5,590,197 A | 12/1996 | Chen et al. ............... 705/65 |
| 5,325,167 A | 6/1994 | Melen .................... 356/71 | 5,602,920 A | 2/1997 | Bestler et al. ............ 380/212 |
| 5,327,237 A | 7/1994 | Gerdes et al. ............ 348/476 | 5,606,609 A | 2/1997 | Houser et al. ............ 713/179 |
| 5,337,361 A | 8/1994 | Wang et al. .............. 380/51 | 5,611,575 A | 3/1997 | Petrie .................... 283/67 |
| 5,337,362 A | 8/1994 | Gormish et al. .......... 380/54 | 5,612,943 A | 3/1997 | Moses et al. .......... 369/124.09 |
| 5,349,655 A | 9/1994 | Mann ..................... 7/416 | 5,613,004 A | 3/1997 | Cooperman et al. ....... 380/28 |
| 5,351,302 A | 9/1994 | Leighton et al. ......... 380/30 | 5,613,012 A | 3/1997 | Hoffman et al. .......... 382/115 |
| 5,374,976 A | 12/1994 | Spannenburg ............ 399/366 | 5,614,940 A | 3/1997 | Cobbley et al. .......... 725/138 |
| 5,379,345 A | 1/1995 | Greenberg ............... 455/2.01 | 5,617,148 A | 4/1997 | Montgomery ............ 348/473 |
| 5,387,941 A | 2/1995 | Montgomery et al. ..... 348/473 | 5,627,655 A | 5/1997 | Okamoto et al. .......... 386/94 |
| 5,394,274 A | 2/1995 | Kahn ..................... 360/27 | 5,629,770 A | 5/1997 | Brassil ................... 358/426.12 |
| 5,396,559 A | 3/1995 | McGrew .................. 380/54 | 5,629,980 A | 5/1997 | Stefik et al. ............. 705/54 |
| 5,398,283 A | 3/1995 | Virga ..................... 380/243 | 5,636,292 A | 6/1997 | Rhoads ................... 705/54 |
| 5,404,160 A | 4/1995 | Schober et al. .......... 725/20 | 5,638,443 A | 6/1997 | Stefik et al. ............. 705/54 |
| 5,404,377 A | 4/1995 | Moses .................... 375/145 | 5,638,446 A | 6/1997 | Rubin .................... 705/51 |
| 5,408,542 A | 4/1995 | Callahan ................. 382/244 | 5,646,997 A | 7/1997 | Barton ................... 713/176 |
| 5,410,598 A | 4/1995 | Shear ..................... 705/53 | 5,647,017 A | 7/1997 | Smithies et al. .......... 382/119 |
| 5,418,853 A | 5/1995 | Kanota et al. ............ 380/203 | 5,649,054 A | 7/1997 | Oomen et al. ........... 704/229 |
| 5,422,963 A | 6/1995 | Chen et al. ............. 382/232 | 5,652,626 A | 7/1997 | Kawakami et al. ....... 348/463 |
| 5,422,995 A | 6/1995 | Aoki et al. ............... 345/545 | 5,659,613 A | 8/1997 | Copeland et al. ......... 380/202 |
| 5,425,100 A | 6/1995 | Thomas et al. ........... 725/20 | 5,659,726 A | 8/1997 | Sandford, II et al. ...... 707/101 |
| 5,428,606 A | 6/1995 | Moskowitz ............... 370/400 | 5,659,732 A | 8/1997 | Kirsch ................... 707/5 |
| 5,428,607 A | 6/1995 | Hiller et al. .............. 370/352 | 5,661,574 A | 8/1997 | Kawana .................. 358/501 |
| 5,432,542 A | 7/1995 | Thibadeau et al. ........ 725/35 | 5,663,766 A | 9/1997 | Sizer, II ................. 348/473 |
| 5,432,870 A | 7/1995 | Schwartz ................. 382/232 | 5,664,018 A | 9/1997 | Leighton ................ 380/54 |
| 5,436,653 A | 7/1995 | Ellis et al. ............... 725/22 | 5,666,487 A | 9/1997 | Goodman et al. ........ 729/246 |
| 5,444,779 A | 8/1995 | Daniele .................. 399/366 | 5,671,277 A | 9/1997 | Ikenoue et al. .......... 713/179 |
| 5,446,273 A | 8/1995 | Leslie .................... 235/487 | 5,678,155 A | 10/1997 | Miyaza .................. 399/366 |
| 5,449,895 A | 9/1995 | Hecht et al. .............. 235/494 | 5,680,223 A | 10/1997 | Cooper et al. ........... 358/403 |
| 5,450,122 A | 9/1995 | Keene .................... 380/253 | 5,687,191 A | 11/1997 | Lee et al. ............... 375/216 |
| 5,450,490 A | 9/1995 | Jensen et al. ............ 380/253 | 5,689,587 A | 11/1997 | Bender et al. ........... 382/232 |
| 5,453,968 A | 9/1995 | Veldhuis et al. ........ 369/47.12 | 5,689,623 A | 11/1997 | Pinard ................... 358/1.6 |
| 5,461,426 A | 10/1995 | Limberg et al. .......... 348/475 | 5,709,932 A | 1/1998 | Glez et al. ............... 428/220 |
| 5,469,506 A | 11/1995 | Berson ................... 713/186 | 5,712,920 A | 1/1998 | Spille .................... 381/104 |
| 5,473,631 A | 12/1995 | Moses .................... 375/130 | 5,719,937 A | 2/1998 | Warren et al. ........... 380/203 |
| 5,479,168 A | 12/1995 | Johnson et al. .......... 341/110 | 5,719,984 A | 2/1998 | Yamagata et al. ......... 386/95 |
| 5,481,294 A | 1/1996 | Thomas et al. ........... 725/20 | 5,721,788 A | 2/1998 | Powell et al. ........... 382/100 |
| 5,488,664 A | 1/1996 | Shamir ................... 380/54 | 5,727,092 A | 3/1998 | Sandford, II et al. ...... 382/251 |
| 5,499,294 A | 3/1996 | Friedman ................ 725/20 | 5,737,025 A | 4/1998 | Dougherty et al. ........ 348/473 |
| 5,500,856 A | 3/1996 | Nagase et al. ............ 370/441 | 5,737,026 A | 4/1998 | Lu et al. ................. 348/473 |
| 5,510,900 A | 4/1996 | Shirochi et al. .......... 386/94 | 5,739,864 A | 4/1998 | Copeland ................ 348/473 |
| 5,513,011 A | 4/1996 | Matsumoto et al. ....... 386/98 | 5,745,569 A | 4/1998 | Moskowitz et al. ....... 705/58 |
| 5,513,260 A | 4/1996 | Ryan ..................... 380/200 | 5,761,686 A | 6/1998 | Bloomberg .............. 715/529 |
| 5,515,081 A | 5/1996 | Vasilik ................... 345/545 | 5,764,763 A | 6/1998 | Jensen et al. ............ 382/115 |
| 5,521,372 A | 5/1996 | Hecht et al. .............. 235/494 | 5,764,770 A | 6/1998 | Schipper et al. ......... 713/176 |
| 5,524,933 A | 6/1996 | Kunt et al. ............... 283/67 | 5,768,426 A | 6/1998 | Rhoads .................. 382/232 |
| 5,526,427 A | 6/1996 | Thomas et al. ........... 725/12 | 5,774,452 A | 6/1998 | Wolosewicz ............ 370/212 |
| 5,530,751 A | 6/1996 | Morris ................... 380/202 | 5,778,102 A | 7/1998 | Sandford, II et al. ...... 382/251 |
| 5,530,759 A | 6/1996 | Braudaway et al. ....... 380/54 | 5,799,081 A | 8/1998 | Kim et al. ............... 380/203 |
| 5,530,852 A | 6/1996 | Meske, Jr. et al. ........ 709/206 | 5,799,082 A | 8/1998 | Murphy et al. .......... 713/179 |
| 5,532,920 A | 7/1996 | Hartrick et al. .......... 715/500 | 5,819,289 A | 10/1998 | Sanford, II et al. ...... 707/104.1 |
| 5,537,216 A | 7/1996 | Yamashita et al. ........ 386/94 | 5,822,360 A | 10/1998 | Lee et al. ............... 375/140 |
| 5,537,223 A | 7/1996 | Curry .................... 358/3.28 | 5,822,432 A | 10/1998 | Moskowitz et al. ....... 380/28 |
| 5,539,471 A | 7/1996 | Myhrvold et al. ......... 348/473 | 5,826,227 A | 10/1998 | Jayant ................... 704/229 |
| 5,541,662 A | 7/1996 | Adams et al. ............ 348/466 | 5,828,325 A | 10/1998 | Wolosewicz et al. ....... 341/52 |
| 5,541,741 A | 7/1996 | Suzuki ................... 358/450 | 5,835,639 A | 11/1998 | Honsinger et al. ........ 382/278 |
| 5,544,255 A | 8/1996 | Smithies et al. .......... 382/119 | 5,850,249 A | 12/1998 | Massetti et al. ........... 725/14 |
| 5,548,646 A | 8/1996 | Aziz et al. ............... 713/153 | 5,857,038 A | 1/1999 | Owada et al. ............ 382/284 |
| 5,557,333 A | 9/1996 | Jungo et al. .............. 348/473 | 5,859,920 A | 1/1999 | Daly et al. .............. 382/115 |
| 5,559,559 A | 9/1996 | Jungo et al. ............. 348/432.1 | 5,862,218 A | 1/1999 | Steinberg ............... 713/176 |
| 5,568,179 A | 10/1996 | Diehl et al. .............. 725/143 | 5,862,260 A | 1/1999 | Rhoads .................. 382/232 |
| 5,568,268 A | 10/1996 | Tsuji et al. .............. 358/296 | 5,878,010 A | 3/1999 | Okamoto et al. .......... 360/48 |
| 5,568,570 A | 10/1996 | Rabbani .................. 382/238 | 5,889,868 A | 3/1999 | Moskowitz et al. ....... 713/176 |
| 5,572,010 A | 11/1996 | Petrie .................... 235/494 | 5,893,067 A | 4/1999 | Bender et al. ........... 704/32 |
| 5,572,247 A | 11/1996 | Montgomery ............ 725/139 | 5,905,505 A | 5/1999 | Lesk ..................... 345/630 |
| 5,574,787 A | 11/1996 | Ryan ..................... 380/29 | 5,905,819 A | 5/1999 | Daly ..................... 382/284 |
| 5,576,532 A | 11/1996 | Hecht .................... 235/494 | 5,907,443 A | 5/1999 | Hirata ................... 360/60 |
| 5,579,124 A | 11/1996 | Aijala et al. ............. 386/96 | 5,929,920 A | 7/1999 | Sizer, II ................. 348/473 |
| 5,581,800 A | 12/1996 | Fardeau et al. ........... 455/2.01 | 5,930,369 A | 7/1999 | Cox et al. ............... 380/54 |

| | | | |
|---|---|---|---|
| 5,937,000 A | 8/1999 | Lee et al. | 375/141 |
| 5,940,135 A | 8/1999 | Petrovic et al. | 348/473 |
| 5,940,429 A | 8/1999 | Lam et al. | 375/130 |
| 5,945,932 A * | 8/1999 | Smith et al. | 341/51 |
| 5,960,151 A | 9/1999 | Takahashi | 386/94 |
| 5,970,140 A | 10/1999 | Sandford, II et al. | 380/205 |
| 5,987,459 A | 11/1999 | Swanson et al. | 707/6 |
| 5,991,500 A | 11/1999 | Kanota et al. | 386/94 |
| 6,000,621 A | 12/1999 | Hecht et al. | 235/494 |
| 6,031,914 A | 2/2000 | Tewfik et al. | 380/54 |
| 6,035,177 A | 3/2000 | Moses et al. | 725/22 |
| 6,044,156 A | 3/2000 | Honsinger et al. | 380/54 |
| 6,061,793 A | 5/2000 | Tewfik et al. | 713/176 |
| 6,078,664 A | 6/2000 | Moskowitz et al. | 380/28 |
| 6,086,706 A | 7/2000 | Brassil et al. | 156/277 |
| 6,101,602 A * | 8/2000 | Fridrich | 713/176 |
| 6,181,802 B1 | 1/2001 | Todd | 382/100 |
| 6,185,312 B1 | 2/2001 | Nakamura et al. | 382/100 |
| 6,209,094 B1 | 3/2001 | Levine et al. | 713/176 |
| 6,219,634 B1 | 4/2001 | Levine | 704/200.1 |
| 6,246,777 B1 * | 6/2001 | Agarwal et al. | 382/100 |
| 6,324,303 B1 * | 11/2001 | Todd | 382/232 |
| 6,332,031 B1 | 12/2001 | Rhoads et al. | 382/100 |
| 6,415,040 B1 * | 7/2002 | Linnartz et al. | 382/100 |
| 6,480,825 B1 * | 11/2002 | Sharma et al. | 704/270 |
| 6,516,079 B1 | 2/2003 | Rhoads et al. | 382/100 |
| 6,546,114 B1 | 4/2003 | Venkatesan et al. | 382/100 |
| 6,570,996 B1 * | 5/2003 | Linnartz | 382/100 |
| 6,574,349 B1 * | 6/2003 | Linnartz et al. | 382/100 |
| 6,611,599 B2 * | 8/2003 | Natarajan | 380/203 |
| 6,625,295 B1 * | 9/2003 | Wolfgang et al. | 382/100 |
| 6,636,615 B1 | 10/2003 | Rhoads et al. | 382/100 |
| 2001/0017709 A1 | 8/2001 | Murakami et al. | 398/1.14 |
| 2001/0024510 A1 | 9/2001 | Iwamura | 382/100 |
| 2002/0010684 A1 * | 1/2002 | Moskowitz | 705/75 |
| 2002/0037093 A1 | 3/2002 | Murphy | 382/112 |
| 2002/0061121 A1 | 5/2002 | Rhoads et al. | 382/100 |
| 2002/0090110 A1 | 7/2002 | Braudaway et al. | 382/100 |
| 2002/0097892 A1 * | 7/2002 | Oami et al. | 382/100 |

FOREIGN PATENT DOCUMENTS

| | | | |
|---|---|---|---|
| EP | 058 482 | 8/1982 | H04M/11/06 |
| EP | 366 381 | 5/1990 | H04H/1/00 |
| EP | 372 601 | 6/1990 | H04B/1/66 |
| EP | 493 091 | 12/1990 | H04N/1/387 |
| EP | 411 232 | 2/1991 | H04N/1/411 |
| EP | 418 964 | 3/1991 | G11B/20/00 |
| EP | 441 702 | 8/1991 | G11B/20/00 |
| EP | 551 016 | 2/1994 | |
| EP | 581 317 | 2/1994 | G07D/7/00 |
| EP | 605 208 | 7/1994 | H04N/1/46 |
| EP | 629 972 | 12/1994 | G06K/15/102 |
| EP | 642 060 | 3/1995 | H04N/1/387 |
| EP | 649 074 | 4/1995 | G03G/21/02 |
| EP | 650 146 | 4/1995 | G07C/9/00 |
| EP | 651 554 | 5/1995 | H04N/1/21 |
| EP | 0651554 | 5/1995 | H04N/1/21 |
| EP | 705 025 | 4/1996 | H04N/1/40 |
| EP | 1077570 | 2/2001 | H04N/1/32 |
| GB | 2063018 | 5/1981 | H04N/11/06 |
| GB | 2067871 | 7/1981 | H04N/7/16 |
| GB | 2196167 | 4/1988 | G11B/23/28 |
| GB | 2204984 | 11/1988 | G11B/23/28 |
| JP | 4-248771 | 9/1992 | H04N/1/44 |
| JP | 05/242217 | 9/1993 | G06F/15/62 |
| JP | 8-30759 | 2/1996 | G11B/20/10 |
| WO | WO89/08915 | 9/1989 | G11B/20/10 |
| WO | WO93/25038 | 12/1993 | H04N/1/00 |
| WO | WO95/10835 | 4/1995 | G11B/31/00 |
| WO | WO95/14289 | 5/1995 | G06K/19/14 |
| WO | WO95/20291 | 7/1995 | H04N/1/32 |
| WO | WO96/21290 | 7/1996 | G06K/17/30 |
| WO | WO96/26494 | 8/1996 | G06K/17/30 |
| WO | WO96/27259 | 9/1996 | H04N/1/32 |
| WO | WO9731440 | 8/1997 | G06K/17/30 |
| WO | WO 97/33392 | 9/1997 | H04N/1/32 |
| WO | WO9746012 | 12/1997 | H04N/1/32 |
| WO | WO 98/53565 | 11/1998 | G06K/9/00 |
| WO | WO 00/00969 | 1/2000 | G11B/23/128 |
| WO | WO 00/22745 | 4/2000 | G11B/23/28 |
| WO | WO0106755 | 1/2001 | H04N/1/32 |
| WO | WO0173997 | 10/2001 | H04K/1/02 |

OTHER PUBLICATIONS

"Access Control and COpyright Protection for Images, WorkPackage 8: Watermarking," Jun. 30, 1995, 46 pages.

"Access Control and COpyright Protection for Images, WorkPackage 3: Evaluation of Existing Systems," Apr. 19, 1995, 68 pages.

"Access Control and COpyright Protection for Images, WorkPackage 1: Access Control and Copyright Protection for Images Need Evaluation," Jun., 1995, 21 pages.

Anderson, "Stretching the Limits of Steganography," Information Hiding, First International Workshop Proc., May 30–Jun. 1, 1996, pp. 39–48.

Arachelian, "White Noise Storm," Apr. 11, 1994, Internet reference, 13 pages.

Arazi, et al., "Intuition, Perception, and Secure Communication," IEEE Transactionson Systems, Man, and Cybernetics, vol. 19, No. 5, Sep./Oct. 1989, pp. 1016–1020.

Arthur, "Digital Fingerprints Protect Artwork," New Scientist, Nov. 12, 1994, p. 24.

Aura, "Invisible Communication," Helskinki University of Technology, Digital Systems Laboratory, Nov. 5, 1995, 13 pages.

Aura, "Practical Invisibility in Digital Communication," Information Hiding, First Int. Workshop Proc. May 30–Jun. 1, 1996, pp. 265–278.

Bartlett, et al., "An Overview of HighWater FBI Technology," Posted on Internet Mar. 22, 1996, 12 pages.

Bender et al, "Techniques for Data Hiding," Draft Preprint, Private Correspondence, dated Oct. 30, 1995, 45 pages.

Bender et al., "Techniques for Data Hiding," Massachusetts Institute of Technology, Media Laboratory, Jan. 1995, 10 pages.

Bender et al., "Techniques for Data Hiding," Massachusetts Institute of Technology, Media Laboratory, Draft Preprint, Apr. 13, 1995, 10 pages.

Bender Techniques for Data Hiding, Proc. SPIE, Vo. 2420, Feb. 9, 1995, pp. 164–173.

Boland et al., "Watermarking digital images for copyright protection", Image Processing and it's Applications, 1995, Conference on, 1995, pp. 326–330.

Boneh, "Collusion–Secure Fingerprinting for Digital Data," Department of Computer Science, Princeton University, 1995, 31 pages.

Boney et al., "Digital Watermarks for Audio Signals," Proceedings of Multimedia '96, 1996 IEEE, pp. 473–480.

Bors et al., "Image watermarking using DCT domain constraints", Image Processing, 19996, Proceedings, International Conference on, vol. 3, 1996, pp. 231–234, vol. 3.

Bors et al., "Embedding Parametric Digital Signatures in Images," EUSIPCO–96, Trieste, Italy, accepted for publication, Sep. 1996 (Published on internet Apr. 9, 1996, (http://poseidon.csd.auth.gr/papers/confers.1_ind.html)), 4 pages.

Boucqueau et al., Equitable Conditional Access and Copyright Protection for Image Based on Trusted Third Parties, Teleservices & Multimedia Communications, 2nd Int. Cost 237 Workshop, Second International Cost 237 Workshop, Nov., 1995; published 1996, pp. 229–243 Brandt et al., "Representations that Uniquely Characterize Images Modulo Translation, Rotation, and Scaling," Pattern Recognition Letters, Aug. 1, 1996, pp. 1001–1015.

Brassil et al., Electronic Marking and Identification Techniques to Discourage Document Copying, Proceedings of INFOCOM '94 Conference on Computer, IEEE Commun. Soc Conference, Jun. 12–16, 1994, 1278–1287.*

Brassil et al., "Hiding Information in Document Images," Nov., 1995, 7 pages.*

Braudaway et al., "Protecting Publicly–Available Images with a Visible Image Watermark," SPIE vol. 2659, Feb. 1, 1996, pp. 126–133.*

Brown, "S–Tools for Window, Version 1.00; What is Steganography," Internet reference, Mar. 6, 1994, 6 pages.*

Bruckstein, A.M.; Richardson, T.J., A holographic transform domain image watermarking method, Circuits, Systems, and Signal Processing vol. 17, No. 3 pp. 361–389, 1998. This paper includes an appendix containing an internal memo of Bell Labs, which according to the authors of the paper, was dated Sep. 1994.*

Bruyndonckx et al., Neural Network Post–Processing of Coded Images Using Perceptual Masking, 1994, 3 pages.*

Bruyndonckx et al., "Spatial Method for Copyright Labeling of Digital Images," 1994, 6 pages.*

Burgett et al., "A Novel Method for Copyright Labeling Digitized Image Data," requested by e–mail from author (unavailable/password protected on IGD WWW site); received Sep. 18, 1995, 12 pages.*

Caronni, "Assuring Ownership Rights for Digital Images," Published in the Proceedings of 'Reliable IT Systems,' VIS '95, HH. Bruggemannn and W. Gerhardt–Hackl (Ed.), Vieweg Publishing Company, Germany, 1995, Jun. 14, 1994, 10 pages.*

Caronni, "Assuring Ownership Rights for Digital Images," Published in the Proceedings of 'Reliable IT Systems,' VIS '95, HH. Bruggemannn and W. Gerhardt–Haackl (Ed.), Vieweg*

Publishing Company, Germany, 1995, Jun. 14, 1994, 10 pages (originally published as an ETH (Zurich) Technical Report, "Ermitteln Unauthorisierter Verteiler von Maschinenlesbaren Daten," Aug. 1993.*

Caruso, "Digital Commerce, 2 plans for watermarks, which can bind proof of authorship to electronic works." New York Times, Aug. 7, 1995, one page.*

Castro et al., "Registration of Translated and Rotated Images Using Finite Fourier Transforms," IEEE Transactions on Pattern Analysis and Machine Intelligence, vol. PAMI–9, No. 5, Sep. 1987, pp. 700–703.*

Cha et al., "A Solution to the On–Line Image Downgrading Problem," Proc. $11^{th}$ Annual Computer Security Applications Conf., Dec. 11, 1995, pp. 108–112.*

Cheong, "Internet Agent, Spiders, Wanderers, Brokers, and Bots," New Riders Publishing Indianapolis, IN, 1996, 413 pages.*

Choudhury, et al., "Copyright Protection for Electronic Publishing over Computer Networks," IEEE Network Magazine, Jun. 1994, 18 pages.*

Chudy, "Handcuff Digital Thieves," Byte Magazine, Apr. 1996, 4 pages.*

"The Copyright Can of Worms Opened Up By The New Electronic Media," Computergram Internations, pCGN07170006, Jul. 17, 1995 and "The Copyright Can of Worms Opened Up By the New Electronic Media–2," Computergram Internations, pCGN07210008, Jul. 21, 1995, 3 pages total.

"Copyright Protection for Digital Images, Digital Fingerprinting from FBI," Highwater FBI brochure, 1995, 4 pages.

Cox et al., "A Secure, Imperceptible Yet Perceptually Salient, Spread Spectrum Watermark for Multimedia," IEEE, Southcon/96, Conference Record, pp. 192–197, 1996.

Cox et al., "Secure Spread Spectrum Watermarking for Multimedia," NEC Research Institute Technical Report, Dec. 5, 1995, 33 pages.

Craver et al., "Can Invisible Watermarks Resolve Rightful Ownerships?" IBM Technical Report RC 20509, Jul. 25, 1996, pp. 1–21. (also published Proc. SPIE—Int. Soc. Opt. Eng. vol. 3022, pp. 310–321, conf. Feb. 13–14, 1997).

"Cyphertech Systems: Introduces Digital Encoding Device to Prevent TV Piracy," Hollywood Reporter, Oct. 20, 1993, p. 23.

Dautzenberg, "Watermarking Images," Department of Microelectronics and Electrical Engineering, Trinity College Dublin, 47 pages, Oct. 1994.

Delaigle et al., "A Psychovisual Approach for Digital Picture Watermarking," 1995, 20 pages.

Delaigle et al., "Digital Watermarking," Proc. SPIE–Int. Soc. Opt. Eng., vol. 2659, pp. 99–110, 1996.

DICE Digital Watermark System, Q&A, Dec., 1995, 12 pages.

Digimarc presentation at RSA Conference, approximately Jan. 17, 1996, 4 pages.

Fimmerstad, "The Virtual Art Museum," Ericsson Connexion, Dec., 1995, pp. 29–31.

Fitzgerald, "Invisible Digital Copyright ID," Editor & Publisher, Jun. 25, 1994, p. 62.

"Foiling Card Forgers With Magnetic 'Noise,'", Wall Street Journal, Feb. 8, 1994.

Franz et al., "Computer Based Steganography: How It Works and Why Therefore Any Restrictions on Cryptography are Nonsense, at Best," Information Hiding, First Int. Workshop Proc, May 30–Jun. 1, 1996, pp. 7–21, (a counterpart was publsihed in German by Steffen Moller et al in 1994).

Frequently Asked Questions About Digimarc Signature Technology, Aug. 1, 1995, http://www.digimarc.com, 9 pages.

Friedman, "The Trustworthy Digital Camera: Restoring Credibility to the Photographic Image," IEEE Transactions on Consumer Electronics, vol. 39, No. 4, Nov., 1993, pp. 905–910.

Gabor, et al., "Theory of Communication," J. Inst. Elect. Eng. 93, 1946, pp. 429–441.

Gerzon, M.A., et al, "A High–Rate Buried–Data Channel for Audio CD," Journal of the Audio Engineering Society, vol. 43, No. 1–2, p. 3–22, Jan.–Feb., 1995.

Haitsma et al., "Audio Watermarking for Monitoring and Copy Protection," ACM Multimedia workshop marina Del Rey, CA ACM 2000 1–58113–311–1/00/11, pp. 119–122.

Hartung et al., Digital Watermarking of Raw and Compressed Video, Proc. SPIE 2952, Digital Compression Technologies and Systems for Video Communications, Oct., 1996, pp. 205–213.

Hecht, "Embedded Data Glyph Technology for Hardcopy Digital Documents," SPIE vol. 2171, Feb. 1994, pp. 341–352.

"High Water FBI Limited Presentation Image Copyright Protection Software," FBI Ltd brochure, Jul., 1995, 17 pages.

"Holographic signatures for digital images," The Seybold Report on Desktop Publishing, Aug. 1995, one page.

Honsinger et al., "Data Embedding Using Phase Dispersion," 2000 Eastman Kodak Company, 9 pages.

Horak, "From 'Steganographia' to Subliminal Communication," "Communications and Multimedia Security," Sep. 1995, pp. 205–213.

Humphrey, "Stamping Out Crime," Hollywood Reporter, Jan. 26, 1994, p. S48.

Jain, "Image Coding Via a Nearest Neighbors Image Model," IEEE Transactions on Communications, vol. COM–23, No. 3, Mar. 1975, pp. 318–331.

Johhnson, "Steganography," Dec. 10, 1995, 32 pages.

JPEG Group's JPEG Software (release 4), ftp.csua.berekeley.edu/pub/cypherpunks/applications/jsteg/jpeg.announcement.gz, Jun. 7, 1992 2 pages.

Kassam, Signal Detection in Non–Gaussian Noise, Dowden & Culver, 1988, pp. 1–96.

Koch et al., "Copyright Protection for Multimedia Data," Proc. of the International Conference on Digital Media and Electronic Publishing, Dec. 6–8, 1994, Leeds. U.K., 15 pages.

Koch et al., "Digital Copyright Labeling: Providing Evidence of Misuse and Tracking Unauthorized Distribution of Copyrighted Materials," Oasis Magazine, Dec. 1995, 3 pages.

Koch et al., "Towards Robust and Hidden Image Copyright Labeling," Proc. of 20995 IEEE Workshop on Nonlinear Signal and Image Processing, Jun. 20–22, 1995, 4 pages.

Komatsu et al., "A Proposal on Digital Watermark in Document Image Communication and Its Application to Realizing a Signature," Electronics and Communications in Japan, Part 1, vol. 73, No. 5, 1990, pp. 22–33.

Komatsu et al., "Authentication System Using Concealed Image in Telematics," Memoirs of the School of Science & Engineering, Waseda Univ., No. 52, 1988, pp. 45–60.

Kurak et al., "A Cautionary Note On Image Downgrading," 1992 IEEE, pp. 153–159.

Lesk, "Digital Libraries Meet Electronic Commerce: On–Screen Intellectual Property," Proceedings of the Third Forum on Research and Technology Advances in Digital Libraries—ADL—'96—(Cat No. 96TB100053), 1996, pp. 58–64.

Luc, "Analysis of Spread Spectrum System Parameters for Design of Hidden Transmission," Radioengineering, vol. 4, No. 2, Jun. 1995, pp. 26–29.

Machado, "Announcing Stego 1.0a2, The First Steganography Tool for the Macintosh," Internet reference, Nov. 28, 1993, 3 pages.

Macq, "Cryptology for Digital TV Broadcasting," Proceedings of the IEEE, vol. 83, No. 6, Jun. 1995, pp. 944–957.

Matsui et al., "Video–Steganography: How to Secretly Embed a Signature in a Picture," IMA Intellectual Property Project Proceedings, Jan. 1994, vol. 1, Issue 1, pp. 187–205.

Matthews, "When Seeing is Not Believing," New Scientist, Oct. 16, 1993, pp. 13–15.

Mintzer et al., "Toward on–line, Worlwide Access to Vatican Library Materials," IBM J. Res. Develop. vol. 40 No. 2, Mar., 1996, pp. 139–162.

Moller, et al., "Rechnergestutzte Steganographic: Wie sie Funktioniert und warum folglich jede Reglementierung von Verschlusselung unsinning ist," DuD, Datenschutz und Datensicherung, 18/6 1994 318–326.

"NAB–Cyphertech Starts Anti–Piracy Broadcast Tests," Newsbytes, NEW03230023, Mar. 23, 1994.

Nakamura et al., "A Unified Coding Method of Dithered Image and Text Data Using Micropatterns," Electronics and Communications in Japan, Part 1, vol. 72, No. 4, 1989, pp. 50–56.

Nikoladis et al., "Copyright Protection of Images Using Robust Digital Signatures," IEEE International Conference on Acoustics, Speech and Signal Processing (ICASSP–96), accepted for publication, May 1996 (Published on internet Apr. 9, 1996, (http://poseidon.csd.auth.gr/papers/confers.1_ind.html)), 4 pages. (Also published 1996 IEEE International Conference on Acoustics, Speech, and Signal Processing Conference Proceedings, May 7–10, 1996, vol. 4, pp. 2168–71).

Ohnishi et al., Embedding a Seal into a Picture Under Orthogonal Wavelet Transform, Proceedings of Multimedia '96, 1996, IEEE, pp. 514–521.

Oomen, A. et al, "A Variable–Bit Rate Buried–Data Channel for Compact Disc," Journal of the Audio Engineering Society vol. 43, No. 1–2, pp. 23–28, Jan.–Feb., 1995.

O'Ruanaidh et al., "Phase watermarking of digital images", Image Processing, 19996, Proceedings, International Conference on, vol. 3, 1996, pp. 239–242, vol. 3.

ORuanaidh et al, "Watermarking Digital Images for Copyright Protection," http://www.kalman.mee.tcd.ic/people/jjr/eva_pap.html, Feb. 2, 1996, 8 pages. (Also published Aug., 1996, IEE Proceedings–Vision, Image and Signal Processing, vol. 143, No. 4, pp. 250–256.).

Pennebaker et al., JPEG Still Image Data Compression Standard, Chapter 3, "Aspects of the Human Visual System," pp. 23–27, 1993, Van Nostrand Reinhold, New York.

Pickholtz et al., "Theory of Spread–Spectrum Communications—A Tutorial," Transactions on Communications, vol. COM–30, No. 5, May, 1982, pp. 855–884.

Pitas et al., "Applying Signatures on Digital Images," IEEE Workshop on Nonlinear Image and Signal Processing, Neos Marmaras, Greece, pp. 460–463, Jun., 1995.

Pitas, "A Method for Signature Casting on Digital Images," 1996 IEEE International Conference on Image Processing (ICIP'96), Lausanne, Switzerland, accepted for publication, Sep. 16–19, 1996 (Published on internet Apr. 9, 1996, (http://poseidon.csd.auth.gr/papers/confers.1_ind.html)), 4 pages.

Port, "Halting Highway Robbery on the Internet," Business Week, Oct. 17, 1994, p. 212.

Proudler, Graeme J., "Authentication and Display of Signatures on Electronic Documents," 2244 Research Disclosure, Feb., 1994, No. 358, Emsworth, GB, 1 page.

Quisquater, J., "Access Control and COpyright Protection for Images, Conditional Access and Copyright Protection Based on the Use of Trusted Third Parties," 1995, 43 pages.

Rindfrey, "Towards an Equitable System for Access Control and Copyright Protection in Broadcast Image Services: The Equicrypt Approach," Intellectual Property Rights and New Technologies, Proc. of the Conference, R. Oldenbourg Verlag Wien Munchen 1995, 12 pages.

Roberts, "Picture Coding Using Pseudorandom Noise," IRE Trans. on Information Theory, vol. 8, No. 2, Feb., 1962, pp. 145–154.

Sandford II et al., "The Data Embedding Method", SPIE vol. 2615, pp. 226–259.

Sapwater et al., "Electronic Copyright Protection," Photo>Electronic Imaging, vol. 37, No. 6, 1994, pp. 16–21.

Schneier, "Digital Signatures, Cryptographic Algorithms Can Create Nonforgeable Signatures for Electronic Documents, Making Them Valid Legal Instruments" Byte, Nov. 1993, pp. 309–312.

Schreiber et al., "A Compatible High–Definition Television System Using the Noise–Margin Method of Hiding Enhancement Information," SMPTE Journal, Dec. 1989, pp. 873–879.

shaggy@phantom.com, "Hide and Seek v. 4.0," Internet reference, Apr. 10, 1994, 3 pages.

Sheng et al., "Experiments on Pattern Recognition Using Invariant Fourier–Mellin Descriptors," Journal of Optical Society of America, vol. 3, No. 6, Jun., 1986, pp. 771–776.

Short, "Steps Toward Unmasking Secure Communications," International Journal of Bifurcation and Chaos, vol. 4, No. 4, 1994, pp. 959–977.

Simmons, "Subliminal Channels; Past and Present," ETT, vol. 5, No. 4, Jul.–Aug. 1994, pp. 45–59.

Sklar, "A Structured Overview of Digital Communications—a Tutorial Review—Part I," IEEE Communications Magazine, Aug., 1983, pp. 1–17.

Sklar, "A Structured Overview of Digital Communications—a Tutorial Review—Part II," IEEE Communications Magazine, Oct., 1983, pp. 6–21.

"Steganography," Intellectual Property and the National Information Infrastructure The Report of the Working Group on Intellectual Property Rights, Sep. 1995, pp. 212–213.

Stone, Analysis of Attacks on Image Watermarks with Randomized Coefficients, May 17, 1996, pp. 1–27.

Szepanski, "A Signal Theoretic Method for Creating Forgery–Proof Documents for Automatic Verification," Proceedings 1979 Carnahan Conference on Crime Countermeasures, May 16, 1979, pp. 101–109.

Szepanski, "Binary Data Transmission Over Video Channels with Very Low Amplitude Data Signals," Fernseh– und Kino–Technik, vol. 32, No. 7, Jul., 1978, pp. 251–256, (German text with full English translation.)

Szepanski, "Compatibility Problems in Add–On Data Transmission for TV–Channels," 2d Symp. and Tech. Exh. On Electromagnetic Compatibility, Jun. 28, 1977, pp. 263–268.

Szepanski, "Optimization of Add–On Signals by Means of a Modified Training Algorithm for Linear Classifiers," IEEE Int'l Symp. On Info. Theory, Oct. 10, 1977, pp. 27–28.

Szepanski, "Additive Binary Data Transmission for Video Signals," Conference of the Communications Engineering Soc. 1980, NGT Technical Reports, vol. 74, pp. 343–351. (German text with full English translation).

Tanaka et al., "A Visual Retrieval System with Private Information for Image Database," Proceeding International Conference on DSP Applications and Technology, Oct. 1991, pp. 415–421.

Tanaka et al., "Embedding Secret Information Into a Dithered Multi–Level Image," Proc. IEEE Military Comm. Conf., Sep. 1990, pp. 216–220.

Tanaka et al., "New Integrated Coding Schemes for Computer–Aided Facsimile," Proc. IEEE Int'l Conf. on Sys. Integration, Apr. 1990, pp. 275–281.

Tanaka, "Embedding the Attribute Information Into a Dithered Image," Systems and Computers in Japan, vol. 21, No. 7, 1990, pp. 43–50.

Tirkel et al, "Electronic Water Mark," DICTA–93, Macquarie University, Sydney, Australia, Dec., 1993, pp. 666–673.

Tirkel et al., A Two–Dimensional Digital Watermark, Conf. Proc. DICTA–95, Dec. 6–8, 1995. 10 pages.

Tirkel, et al "Image Watermarking–A Spread Spectrum Application" Proc. IEEE, ISSSTA '96, Mainz, Germany, Sep. 22–25, 1996, vol. II, p. 785–789.

Toga et al., "Registration Revisited," Journal of Neuroscience Methods, 48 (1993), pp. 1–13.

Van Schyndel et al., "A Digital Watermark," IEEE International Conference on Image Processing, Nov. 13–16, 1994, pp. 86–90.

van Schyndel et al., "Towards a Robust Digital Watermark," ACCV '95, vol. 2, Dec., 1995, pp, 504–508.

Voyatzis et al., "Applications of Total Automorphisms in Image Watermarking," 1996 IEEE International Conference on Image Processing (ICIP'96), Lausanne, Switzerland, Part vol. 2, pp. 237–240, Sep. 16–19, 1996 (Published on internet Apr. 9, 1996, (http://poseidon.csd.auth.gr/papers/confers.1_ind.html)), pages. 1996 IEEE, sep. 16–19, 1996 Laussane, Switzerland, pp. 237–239.

Voyatzis, et al., Chaotic Mixing of Digital Images and Applications to Watermarking, European Conference on Multimedia Applications, Services and Techniques (ECMAST'96), Louvain–la–Neuve, Belgium accepted for publication, May 1996 (Published on internet Apr. 9, 1996), (http://poseidon.csd.auth.gr/papers/confers.1_ind.html)), 8 pages.

Wagner, "Fingerprinting," 1983 IEEE, pp. 18–22.

Walton, "Image Authentication for a Slippery New Age," Dr. Dobb's Journal, Apr. 1995, pp. 18–26, 82–87.

"Watermarking & Digital Signature: Protect Your Work!" Published on Internet 1996, http://Itswww.epfl.ch/.about.jordan/watermarking.html.

Weber et al., "Correlative Image Registration," Seminars in Nuclear Medicine, vol. XXIV, No. 4, (Oct.), 1994, pp. 311–323.

Wise, "The History of Copyright, Photographer' Rights Span Three Centuries," Photo>Electronic Imaging, vol. 37, No. 6, 1994.

Zhao, et al., "Embedding Robust Labels Into Images for Copyright Protection," Proc. of the International Congress on Intellectual Property Rights for Specialized Information, Knowledge and New Technolgies (Vienna, Austria) Aug. 21–25, 1995, 10 pages.

Zhao, "A WWW Service to Embed and Prove Digital Copyright Watermarks," in Proc. of the European Conf. on Multimedia Applications, Serivces and Techniques, Louvain–La–Neuve, Belgium, May 1996, 14 pages.

Alattar, "*Smart Images*"*Using Digimarc's Watermark Technology*, SPIE $12^{th}$, Int'l Symposium on Electronic Imaging, Vo. 3971, No. 25, pp. 1–10, Jan. 25, 2000.

Bender et al., "Applications for Data Hiding," IBM Systems Journal, vol. 39, No. 3–4, pp. 547–568, 2000.

Yeung et al., "Digital Watermarks: Shedding Light on the Invisible," IEEE Computer, pp. 32–41, 1998.

* cited by examiner

DIGITAL WATERMARK SCREENING AND DETECTION STRATEGIES

RELATED APPLICATION DATA

This patent application is a continuation of Ser. No. 09/526,982, filed Mar. 15, 2000, (now U.S. Pat. No. 6,516,079), which is a continuation-in-part of application Ser. No. 09/503,881, filed Feb. 14, 2000 (Now U.S. Pat. No. 6,614,914).

TECHNICAL FIELD

The invention relates to digital watermarking, and more particularly relates to watermark detection in multimedia content (e.g., still image, video and audio signals).

BACKGROUND AND SUMMARY

The reader is presumed to be familiar with digital watermarking technology. See, e.g., co-pending application Ser. No. 09/503,881, filed Feb. 14, 2000, entitled Watermark Reader and Embedder, the disclosure of which is incorporated by reference.

One objective of watermark detectors is to reject unmarked signals (e.g., image, audio, video signals) at the earliest possible stage of detection. The detector may conclude that a signal is unmarked based on quantitative evidence of the watermark (or lack thereof) in a signal suspected of having a watermark. The signal might be an unmarked component of a marked signal, or simply an unmarked signal. Also, in some cases, the signal, though previously marked, may appear to be unmarked due to removal or degradation of the watermark. By accurately identifying an unmarked signal at an early stage, the detector can avoid unnecessary processing. Also, the apparent absence of a watermark may trigger some action (or prevent an action) such as providing output indicating that the signal has been tampered with or controlling processing of the signal (e.g., preventing copying, playing or recording in copy protection applications).

A related objective of a watermark detector is measuring the strength of a watermark signal. Based on the watermark strength, the detector can assess whether a suspect signal has a valid watermark, and the extent to which a signal has been transformed. The detector can also determine the likelihood that a suspect signal includes a valid watermark or recoverable watermark message. Such an evaluation helps the detector allocate its processing resources on portions of the suspect signal that are likely to contain a valid watermark or recoverable watermark message.

The cited application describes a variety of techniques for detecting a watermark. Some of these techniques correlate attributes of a watermark signal with a signal suspected of containing a watermark. By measuring the extent of correlation, a watermark detector assesses whether a watermark is present, and in some cases, determines its orientation in the suspect signal. Related techniques detect a watermark signal by at least partially decoding a message from the suspect signal and then comparing attributes of the message with expected attributes to assess the likelihood that a watermark signal is present. These and other techniques may be used to compute a detection value that quantifies the likelihood that the suspect signal has a watermark.

This disclosure describes methods of using detection values ascertained from signals suspected of being watermarked to control the detection process. The detection values may be used to reject unmarked signals. In addition, they may be used to refine the detection process by focusing the detector on signals or portions of signals that are likely to contain a watermark and/or a recoverable watermark message. Each portion of a suspect signal may be defined by an orientation parameter (or set of parameters like rotation, scale, origin, shear, differential scale, etc.). Also, each portion may represent different orientations of the suspect signal, or a component of the signal.

This disclosure also describes a method for using two or more detection metrics to control the detection process. The multiple metrics could be derived from independent measurements in multiple stages or could be different features of the same measurement. Each detection metric evaluates detection values to control detection actions. One type of detection metric is a screen used to evaluate suspect signals or portions of a suspect signal for the presence of a watermark. Each stage evaluates detection values to assess whether a suspect signal, or portion of it, is marked.

This disclosure also describes a method for using absolute and relative detection measures to assess whether a suspect signal is marked. An absolute measure of detection represents quantitative evidence of a watermark signal in a suspect signal, and is usually evaluated independently from other detection values. A relative measure is based on the relative values of two or more detection values, which may be relative or absolute measures. A relative measure may be implemented by computing absolute detection values for different portions of a suspect signal and then computing a relative detection value as a function of the absolute detection values.

Both absolute and relative detection values may be evaluated relative to desired limits or thresholds to determine an appropriate action. One action is to reject the candidate signal associated with the detection value as being unmarked. Another action is to use the detection values to direct further actions of the detector. One advantage of using both absolute and relative detection values is that they usually contain complementary information. This complementary information helps in improving the watermark screening and detection process.

In one implementation, a detector computes detection values for different orientation parameter candidates, sorts the detection values in terms of likelihood of representing a valid watermark, and then takes a ratio of a top detection value relative to one or more lesser detection values. The orientation parameter candidates define an approximate orientation and/or location of a watermark in a suspect signal, and as such are associated with a portion of a suspect signal.

The invention provides a method of analyzing a signal suspected of being embedded with an auxiliary signal. This method computes detection values from a suspect signal. Each detection value corresponds to a measure of an auxiliary signal embedded in the suspect signal. The auxiliary signal being detected comprises a set of attributes embedded at locations within the suspect signal, and each detection value is a measure of the set of attributes. The method computes a relative detection value based on an analysis of two or more of the detection values relative to each other, and controls detector action based on the relative detection value. This detector action may include distinguishing signals that are marked with an auxiliary signal from those that are not. It may also include determining whether the suspect signal is authentic based on the detection values associated with an embedded auxiliary signal.

Another aspect of the invention is a method of detecting an auxiliary signal embedded in a suspect signal. The embedded auxiliary signal has a set of attributes embedded at locations within the suspect signal. The method computes detection values for two or more auxiliary signal candidates in the suspect signal. It evaluates a detection metric based on the detection values, and controls a detector action based on the detection metric. The metric provides a measure of an embedded auxiliary signal that adapts to the suspect signal according to detection values computed from the suspect signal. The detection values are each computed as a measure of the set of attributes of the auxiliary signal.

Another aspect of the invention is a detector for analyzing suspect signals having embedded auxiliary signals. The detector has a first screening stage for classifying a suspect signal based on a first detection metric that measures a set of attributes of an auxiliary embedded signal. It also has at least a second screening stage for classifying the suspect signal based on a second detection metric that measures a set of attributes of an auxiliary embedded signal. The first and second stages form a multistage classifier for determining whether a suspect signal is authentic based on measures derived from an embedded auxiliary signal.

The foregoing and additional features and advantages of the present invention will be more readily apparent from the following detailed description, which proceeds with reference to the accompanying drawings.

DETAILED DESCRIPTION

Figure 1:
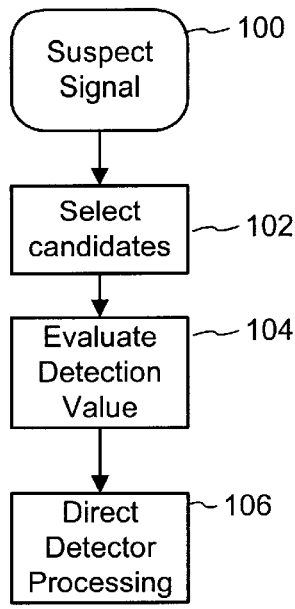
FIG. 1 is a flow diagram illustrating a watermark detection process.

A watermark decoder detects a watermark in a suspect signal by computing evidence of watermark signal attributes in the suspect signal. The watermark signal attributes used in detection may be referred to as a calibration or synchronization signal (hereafter referred to as "calibration signal"). The calibration signal may be watermark signal attributes that correspond to message symbols embedded in a watermark. For example, a watermark message may include a "signature" of one or more symbols known to the decoder. In the process of encoding the signature, a watermark encoder modifies a host media signal to compute a composite signal with signal attributes of the signature. To detect the watermark in a suspect signal, a detector analyzes the suspect signal to find evidence of the signature. In this case, the calibration signal corresponds to the attributes of the composite signal used to encode the signature.

The calibration signal may also be an orientation watermark. To encode the orientation mark, the watermark encoder modifies the host signal to compute a composite signal with signal attributes of the orientation signal. To detect the watermark, a detector analyzes a suspect signal to find evidence of the orientation signal. In this case, the calibration signal corresponds to the orientation signal. Both a message signature and an orientation signal may be embedded in a host signal. Some watermark signals may perform a dual function of encoding a signature and an orientation signal (e.g., a watermark signal acts as a signature and an orientation signal).

The following description uses the term "calibration signal" to broadly encompass watermark signal attributes used to identify a watermark in a suspect signal. Unless specified otherwise, the calibration signal should be construed to encompass watermark message symbols and/or an orientation signal used to detect a watermark.

To detect a watermark in a suspect signal, a detector computes quantitative evidence of the calibration signal. One form of evidence is a detection value indicating the extent to which a portion of the suspect signal has attributes that match those of the calibration signal. One such measure is a correlation value that quantifies the correlation between the calibration signal and a portion of the suspect signal. Another measure is the extent to which the known signature matches a signature computed from the suspect signal.

In the process of detecting a watermark in a suspect signal, the detector may analyze several portions of the suspect signal. In many watermark systems, a key specifies where a watermark is located in an unmodified watermarked signal. However, the decoder does not know whether there is a watermark in a suspect signal. Moreover, transformation of the composite signal may degrade the watermark and alter its orientation in a suspect signal. For many applications, the detector must search for the presence of a watermark and determine its orientation. This process is sometimes referred to as synchronization.

The synchronization process varies depending on the type of host and watermark signal. In images, the orientation of the watermark may change due to transformations of the host image (e.g., geometric transforms, spatial frequency transforms, phase transforms etc.). In audio, the location of the watermark may also change due to transformations (e.g., temporal shifting or scaling due to up-sampling or down-sampling, frequency shifting, phase shifting, etc.). In video signals, the location of the watermark may change due to these and other transformations.

Because these transforms may alter a watermark, the detector analyzes several different portions of the suspect signal to find evidence of it. A watermark key may help guide the analysis around certain portions of the suspect signal. Each of these portions has one or more orientation parameters that define a location (and/or orientation) in the suspect signal. In an audio sequence, the portion might be a time window or range of frequencies within an audio segment. In an image, the portion may be a two-dimensional spatial area or range of frequencies. To simplify the discussion, these portions of the suspect signal and their corresponding orientation parameter (or parameters) are generally referred to as candidates. The detector may compute a detection value for each candidate. Then, based on these detection values, the detector may assess whether a watermark is present, and the strength of the watermark.

FIG. 1 illustrates a process for detecting a watermark in a suspect signal. The detector identifies candidates in the suspect signal (100, 102). A watermark key may be used to locate the candidates. Used in the watermark encoder to embed the calibration signal, the key generally specifies the location of the calibration signal in an unmodified marked signal. The detector then computes a detection value for the candidates (104). Next, it determines how to direct further detector actions based on the detection values (106). The detection value may be an absolute measure derived from a single candidate. Alternatively, it may be relative measure, computed by evaluating the detection value of one or more candidates relative to other candidates.

The detector may implement different actions based on evaluation of the detection values. One action is to reject the suspect signal as being un-marked. Another action is to use the detection measures to refine initial detection results. One way to refine the initial detection result is to select additional candidates that may increase the likelihood of accurate detection of a watermark and/or recovery of a message embedded in it. In short, the detector may use the detection values to focus detector resources on portions of the suspect signal that show promising evidence of a watermark and/or its calibration signal.

EXAMPLE EMBODIMENTS

Figure 2:
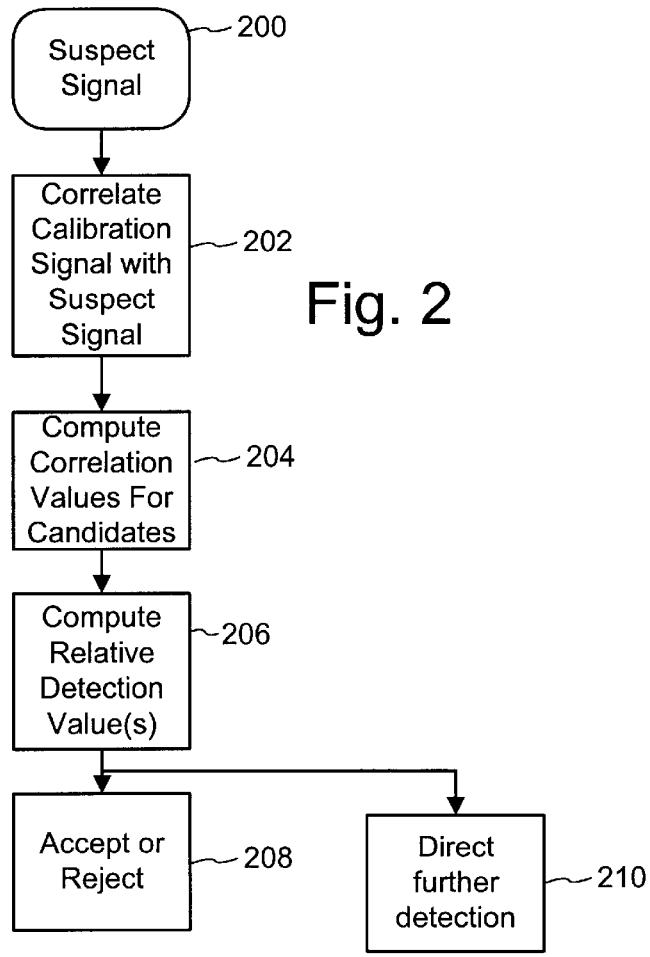
FIG. 2 is a flow diagram showing a watermark detector that correlates a calibration signal with a suspect signal to compute detection values.

FIG. 2 illustrates an example embodiment of a watermark detector that uses detection values to reject unmarked signals and to direct further detection actions. In this example, the detector correlates the calibration signal (or attributes of it) with the suspect signal (200, 202). In performing the correlation process, the detector may use a watermark key to select initial portions of the suspect signal expected to contain a watermark. For example, the key may specify that the calibration signal has been encoded into marked signals in a particular spatial or temporal location in some given transform domain.

The correlation process (202) computes correlation values for candidate portions of the suspect signal that exhibit some evidence of the calibration signal (204). A variety of correlation methods may be employed, including, for example general matched filtering. Each candidate may be defined by one or more orientation parameters that describe its location and orientation within the suspect signal. The correlation values for each candidate are absolute detection values.

Next, the detector computes relative detection values based on the detection values calculated previously from the suspect signal (206). One example of a relative detection value is a ratio of a top absolute detection value to one or more lesser detection values. The detection process may repeat, iteratively refining candidates by adjusting their orientation parameters. In this case, there may be several sets of absolute detection values, and corresponding relative detection values for each set.

After the detector has computed detection values, it uses those values to control further detection actions. One action is to screen and reject un-marked signals (including un-marked portions of a signal, or portions where a watermark has been degraded) (208). Another action is to use promising detection values (e.g., those values falling within a desired range or exceeding a limit) to direct further detection operations on the suspect signal (210). The cited application provides an example of this action where orientation parameter candidates associated with top detection values are refined to improve detection and watermark message recovery. These types of actions can be used in detectors for different types of signals, including still image, audio and video signals.

Figure 3:
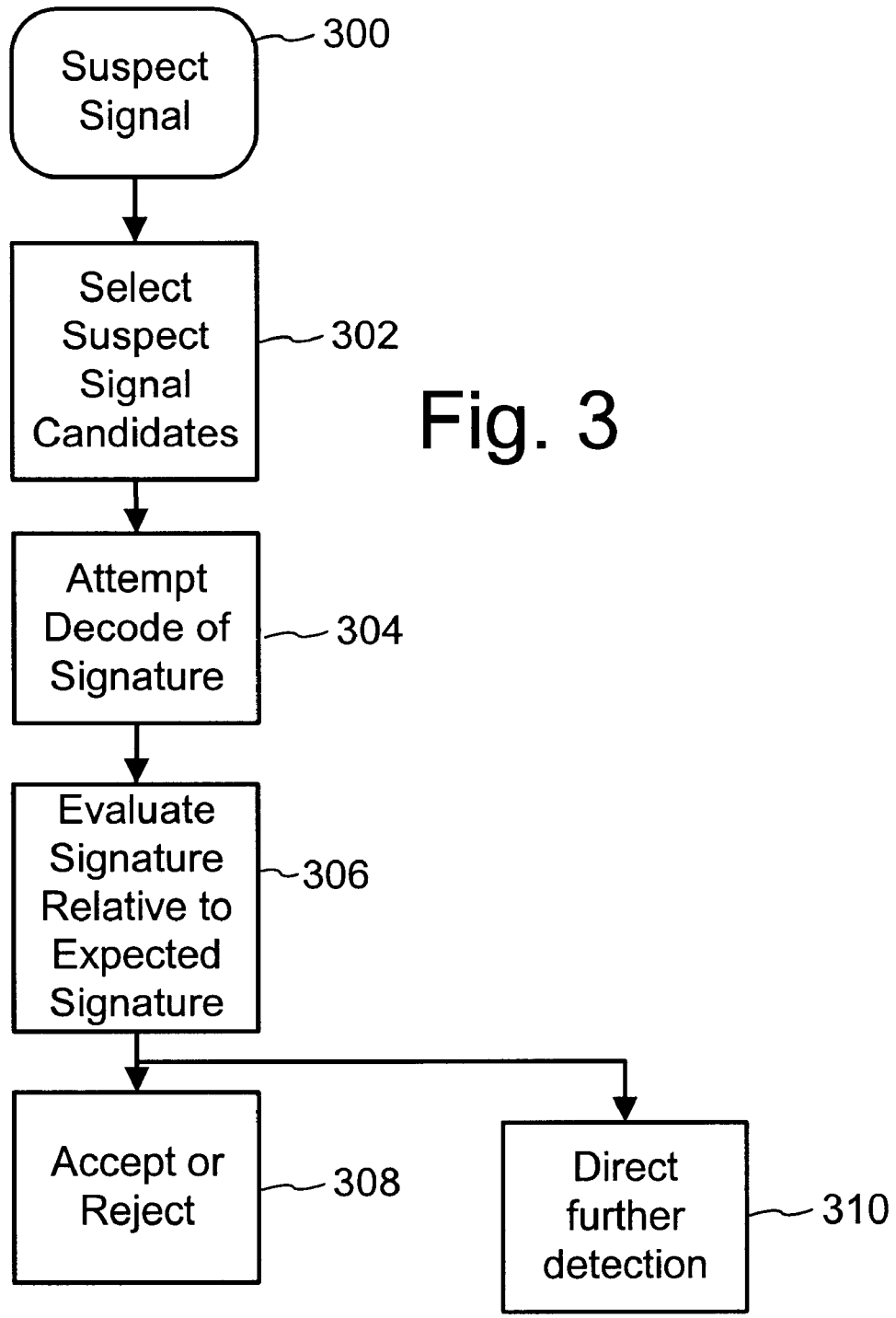
FIG. 3 is a flow diagram showing a watermark detector that computes detection values by comparing an expected signature with a watermark signature taken from a suspect signal.

FIG. 3 illustrates an example embodiment of a watermark detector in which the calibration signal is in the form of a signature. In this example, the detector begins by evaluating candidates in the suspect signal (300). As in the prior example, a watermark key may be used to specify an initial candidate location of a calibration signal, assuming that the suspect signal has been marked (302). Using the key to identify a candidate location of a watermark, the detector attempts to decode the signature at the candidate location (304). Even if the suspect signal has been watermarked, the signature may be degraded and/or geometrically transformed due to manipulation of the watermarked signal.

Next, the detector evaluates the decoded signature relative to the signature used in the encoder (the expected signature) (306). One way to evaluate the signature is to measure the similarity between the decoded signature and the expected signature. An example of this similarity measure is the percentage agreement computation in the cited application. The similarity measure is another example of a detection value associated with a particular candidate.

Another way to evaluate the presence of a signature in the suspect signal is to perform correlation between signal attributes of the one or more expected symbols and the suspect signal. In fact, some implementations use correlation to decode watermark message symbols. The extent of correlation provides a measure of similarity between an expected signature and a signature observed in the suspect signal.

Based on the detection value, the detector may reject the signal as being unmarked (308). For example, if the detection value falls below a limit (either predetermined or adapted based on the suspect signal), then the detector may conclude that the associated signal is unmarked.

The detector may also quantify the extent of watermark degradation. For example, a low detection value represents significant degradation, while a high detection value represents minimal degradation. Such detection values are useful in signal authentication or copy control applications where the extent of degradation is used, for example, to determine whether the suspect signal is authentic or to control use of the suspect signal (e.g., enable/prevent its transmission, playback, recording or copying).

The detector may also use the detection value to refine its search for a valid calibration signal (310). For example, when the detection values fall within certain limits, then they direct the detector to focus its attempt to synchronize with the calibration signal around the orientation parameter or parameters that yield such detection values.

The cited application describes methods for computing detection values and using them to direct the actions of the detector. In one implementation, the detector performs multiple stages of detection. One form of calibration signal is an orientation signal. The detector performs correlation between an orientation signal and the suspect signal. Based on the measure of correlation, the detector determines whether to reject the suspect signal. A detection value derived from the correlation is then used to make a decision whether to reject the suspect signal as un-watermarked, or to allow it to proceed to later detection stages.

In a particular implementation in the cited application, an initial detection stage decides whether a watermark is present in a suspect image and, if so, provides estimates of orientation parameters to later detection stages. In other words, the initial detection stage acts as a classifier that discriminates between marked and unmarked images. The initial detection stage computes rotation and scale parameter candidates, and a measure of correlation for these candidates. It then determines whether to reject the suspect signal based on these measures of correlation. One test for screening unmarked signals is to compute a ratio of the top correlation value to other lesser correlation values for the candidates and then reject the signal as unmarked if the ratio does not exceed a limit. If the screen does not reject the suspect image, later detection stages refine the orientation parameter candidates by computing translation parameters (i.e. the origin of the watermark) and/or other parameters such as differential scale and shear.

For the orientation parameter candidate, the detector computes correlation between the orientation signal and the suspect signal. This correlation can be computed in the spatial domain, the Fourier magnitude domain, or some other transform domain.

In some applications, the detection strategy can be improved by performing one or more additional tests on candidates to control further detector processing actions.

One strategy, detailed below, uses a two stage test to reject un-marked images. This strategy uses both absolute and relative detection values. In experiments, this strategy rejects approximately 99% of unmarked images at an initial detection stage.

Ideally, the initial detection stage should allow all watermarked images to proceed to later detection stages but reject all unmarked images. However, any practical classifier would accept some number of unmarked images (false positives) and reject some number of marked images (false negatives). The goal is to minimize both the false positives and the false negatives.

Figure 4:
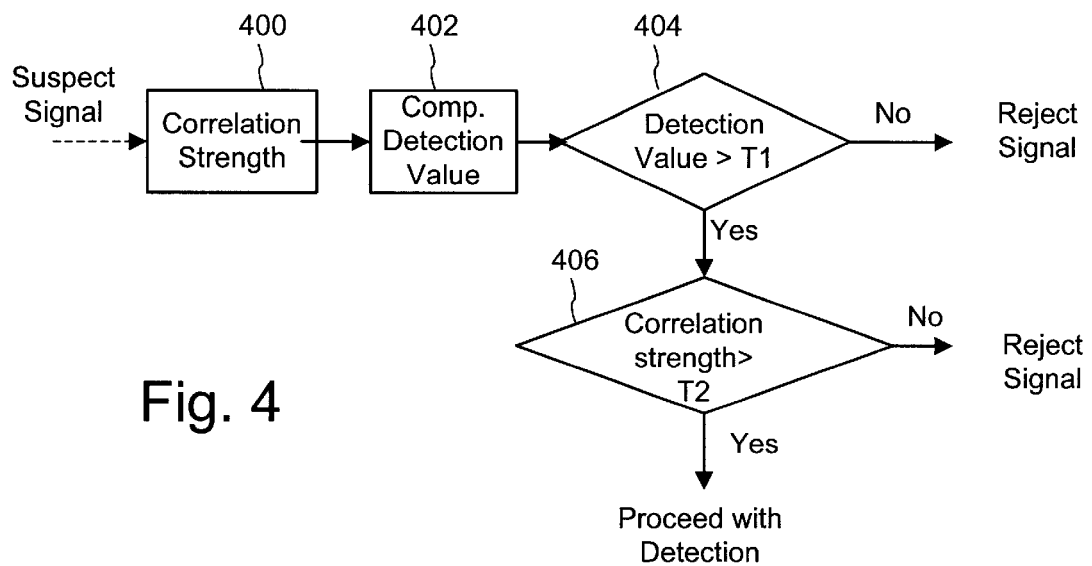
FIG. 4 is a flow diagram of a process for screening un-marked signals based on detection metrics.

FIG. 4 illustrates an example of a screening strategy that achieves this goal.

Screen I—This screening strategy uses a detection metric based on relative detection values. Correlation values corresponding to the top candidates are used to compute the relative detection value. In particular, the relative detection value is computed as a ratio of a top correlation value to one or more lesser correlation values or combination of lesser correlation values (e.g., an average of the next N best correlation values). The detection value is compared to a pre-determined threshold T1. If the detection value exceeds T1, the detector proceeds to screen II. If the detection value fails to exceed T1, the suspect image is labeled an unmarked image and further processing ceases.

The correlation value may be computed in a variety of ways, depending on the nature of the orientation and suspect signals. For images, the correlation may be performed in one or more of the following domains: spatial, transform domain (e.g., Fourier domain), etc. In the case where the orientation signal is an array of impulse functions in the Fourier domain, the detector preferably computes the correlation in the Fourier domain. One measure of correlation analyzes the extent to which the impulse functions of the orientation signal are present in the Fourier Magnitude domain. This is a type of correlation strength and is referred to as Fourier Magnitude Correlation (FMC).

One way to compute the correlation strength in this context is to compute the dot product of the impulse functions of the orientation signal and the suspect signal in the Fourier Magnitude domain. The dot product is computed between the two signals after transforming the orientation signal to a candidate orientation (e.g., rotating and scaling it based on rotation and scale parameter candidates).

A related method is to perform an additional filtering process of the samples of the suspect signal in a neighborhood around the location of each impulse function and then summing the result of filtering around each impulse function location. This operation gives an indication of the extent to which the impulse functions are present in the suspect signal. The neighborhood can be defined in a variety of ways, including a square neighborhood of samples centered at the location of the impulse function, or a neighborhood defined along a line or lines through the impulse function (e.g., horizontal line, vertical line, or radial line through the origin of the coordinate space).

One such filtering operation is to divide the sample in the suspect signal at the impulse location by an average of neighboring samples. If the average value is zero, then the filter result is set to some constant value. In one implementation, the result of filtering at each impulse function location in the Fourier magnitude domain is added to compute a measure of correlation.

A number of variations to this filtering operation are possible. One such variation is to insert a thresholding function before adding the filtering results. One example is a thresholding process that subtracts a first constant from each filtered result, and then clips values greater than a second constant to that constant value. The result of the thresholding operation is summed to derive a measure of correlation strength.

Screen II—In this screen, the correlation strength (corresponding to the top candidate after Fourier magnitude correlation) is compared to a pre-determined threshold T2. If the correlation strength exceeds T2, then the suspect image is allowed to proceed to the later detection stages. If the correlation strength fails to exceed T2, the suspect image is labeled an unmarked image and rejected.

Empirical data shows that for unmarked images, whose correlation strength is high, the remaining correlation values are also comparatively high. Therefore the resulting detection value is low. Screen I is well suited to reject such unmarked images. Most of the unmarked images that do make it beyond Screen I have lower correlation strengths and are rejected by the second step. The combination of the two screens gives high rejection rates.

The correlation strength is a useful figure of merit since it gives an approximate indication of how many orientation signal impulses (out of the total number of impulses in the orientation signal) were detected. Its use as a measure of the strength of the orientation signal can provide a further metric useful in later stages of detection.

A beneficial consequence of high rejection rates at an early detection stage is faster performance (speed of detection). Higher rejection means that the detector can avoid additional processing of later detection stages, which may by more computationally complex. As a result, the mean performance times are reduced.

The following points can be made about this two stage screening:

1) There are two screening stages to reject unmarked images. The first stage uses a metric based on a relative detection value. Images that pass this test are subjected to an additional screen where the correlation strength is compared to a pre-determined threshold. Images that do not exceed this threshold are rejected; others proceed to the later detection stages.
2) The improved false positive rate means that the overall false positive statistics (all stages combined) improves commensurately.
3) The reduction in false positives translates into major performance improvements since very few (approximately 1%) of the unmarked images now reach the next stage of detection. In the cited application, additional stages used to refine the orientation parameter candidates (e.g., compute differential scale, shear, translation) and to decode a watermark message can be avoided or can be made more efficient by focusing on candidates that are more likely to represent a valid, recoverable watermark signal.
4) The correlation strength can be used as a figure of merit for the orientation signal.

5) The method can be extended to more than two screens.
6) In some cases, the order of the screens may be important. For example, interchanging the order of Screen I and Screen II may not provide good results. The order can be determined empirically using training data.
7) In each stage of detection, the detector can compute detection values based on one or more features of the suspect signal. Then, using possibly independent detection values from these stages, the detector can combine these values in metrics for screening and refining orientation parameters. Detection values may be considered independent if they are computed independently, rather than derived from each other. For example, a measure of correlation for an orientation signal in a watermark may be independent from a measure of similarity between expected and decoded message symbols from a watermark message.

The detector may compute different measures of correlation in each stage and evaluate a metric that combines information from these correlation measures to get improved rejection of unmarked signals.

The measures of correlation may be different in that they are computed in different domains (e.g., spatial, temporal, transform domains), are based on different orientation parameters, are computed for different parts of the suspect signal, or are based on different attributes of the watermark.

The features evaluated in each stage need not be measures of correlation. For example, one stage may evaluate the similarity between a decoded symbol or symbols from the suspect signal and symbol or symbols expected to be in a watermark message. A statistical analysis may be employed to indicate the likelihood that the decoded symbols represent expected symbols. Based on the similarity measure and/or statistical likelihood, the detection stage provides a detection value that can be combined with a detection value derived from another detection stage. In sum, effective detection metrics may be constructed by combining information from different stages. These detection metrics can then be used to control detector action, such as rejected unmarked signals or focusing further detection on portion of the suspect signal that appear more likely to have a valid, recoverable watermark.

CONCLUDING REMARKS

Having described the principles of my invention with reference to an illustrative embodiment, it should be apparent that the invention can be modified in arrangement and details without departing from such principles. Accordingly, we claim as our invention all such embodiments as may come within the scope and spirit of the following claims, and equivalents thereto.

To provide a comprehensive disclosure without unduly lengthening the specification, applicant incorporates by reference any patents and patent applications referenced above.

The particular combinations of elements and features in the above-detailed embodiments are exemplary only; the interchanging and substitution of these teachings with other teachings in this and the incorporated-by-reference patents/applications are also contemplated.

We claim:

1. A method of analyzing a signal suspected of being embedded with an auxiliary signal, the method comprising:
computing detection values from a suspect signal, where each detection value corresponds to a measure of an auxiliary signal embedded in the suspect signal, the auxiliary signal being detected comprises a set of attributes embedded at locations within the suspect signal, and each detection value is a measure of the set of attributes;
computing a relative detection value based on an analysis of two or more of the detection values relative to each other; and
controlling detector action based on the relative detection value.

2. The method of claim 1 wherein the detector action comprises determining whether the suspect signal is authentic.

3. The method of claim 1 where the detection values have corresponding orientation parameters; and wherein the orientation parameters approximate a spatial or temporal transform that at least a portion of the suspect signal has undergone subsequent to being embedded with an auxiliary signal.

4. A tangible medium on which is stored instructions for performing the method of claim 1.

5. The method of claim 1 wherein the auxiliary signal carries hidden message symbols in the suspect signal.

6. The method of claim 1 wherein the auxiliary signal performs a dual function of carrying a message of two or more symbols and an orientation signal.

7. The method of claim 1 wherein the attributes comprise impulse functions in a transform domain.

8. The method of claim 7 wherein the transform domain comprises a frequency domain.

9. The method of claim 7 including filtering impulse functions detected in the suspect signal as a function of neighboring samples of the detected impulse functions.

10. The method of claim 1 wherein the detection values comprise correlation values.

11. The method of claim 10 wherein the detection values comprise correlation values in a two dimensional correlation.

12. A method of detecting an auxiliary signal embedded in a suspect signal, the embedded auxiliary signal having a set of attributes embedded at locations within the suspect signal, the method comprising:
computing detection values for two or more auxiliary signal candidates in the suspect signal;
evaluating a detection metric based on the detection values; and controlling a detector action based on the detection metric; wherein the metric provides a measure of an embedded auxiliary signal that adapts to the suspect signal according to detection values computed from the suspect signal; and wherein the detection values are each computed as a measure of the set of attributes of the auxiliary signal.

13. The method of claim 12 wherein the detection metric comprise a measure of strength of an auxiliary signal embedded in the suspect signal.

14. The method of claim 13 wherein the measure of strength is used to determine whether the suspect signal is authentic; and wherein a further detection action is evaluating the metric to determine whether the suspect signal is authentic.

15. The method of claim 12 wherein the detection values comprise correlation values.

16. The method of claim 12 wherein the detection metric is part of a multistage classifier for classifying the suspect signal.

17. The method of claim 16 wherein the classifier classifies the suspect signal as being marked or un-marked with an auxiliary embedded signal.

18. The method of claim 16 wherein the classifier determines whether the suspect signal is authentic.

19. A tangible medium on which is stored instructions for performing the method of claim 12.

20. A detector for analyzing suspect signals having embedded auxiliary signals comprising:

a first screening stage for classifying a suspect signal based on a first detection metric that measures a set of attributes of an auxiliary embedded signal;

a second screening stage for classifying the suspect signal based on a second detection metric that measures a set of attributes of an auxiliary embedded signal;

wherein the first and second stages form a multistage classifier for determining whether a suspect signal is authentic based on measures derived from an embedded auxiliary signal.

* * * * *